United States Patent
Voigt et al.

(10) Patent No.: US 10,350,552 B2
(45) Date of Patent: Jul. 16, 2019

(54) FILTER ELEMENT AND METHOD FOR THE PRODUCTION THEREOF

(71) Applicant: WTA VOGTLAND GmbH, Plauen (DE)

(72) Inventors: Reinhard Voigt, Gotha (DE); Volker Albrecht, Plauen (DE); Hardy Mueller, Muldenhammer (DE); Kurt Bock, Erfurt (DE); Eberhard Semmler, Blankenhain OT Meckfeld (DE)

(73) Assignee: WTA VOGTLAND GMBH, Plauen (DE)

( * ) Notice: Subject to any disclaimer, the term of this patent is extended or adjusted under 35 U.S.C. 154(b) by 150 days.

(21) Appl. No.: 15/307,977

(22) PCT Filed: Apr. 29, 2015

(86) PCT No.: PCT/EP2015/059377
§ 371 (c)(1),
(2) Date: Oct. 31, 2016

(87) PCT Pub. No.: WO2015/165988
PCT Pub. Date: Nov. 5, 2015

(65) Prior Publication Data
US 2017/0056836 A1    Mar. 2, 2017

(30) Foreign Application Priority Data
Apr. 30, 2014 (DE) .................. 10 2014 208 200

(51) Int. Cl.
*B01D 69/12* (2006.01)
*B01D 39/16* (2006.01)
(Continued)

(52) U.S. Cl.
CPC .......... *B01D 69/12* (2013.01); *B01D 39/163* (2013.01); *B01D 39/1692* (2013.01);
(Continued)

(58) Field of Classification Search
CPC .. B01D 69/12; B01D 63/081; B01D 39/1692; B01D 39/163; B01D 2313/12;
(Continued)

(56) References Cited

U.S. PATENT DOCUMENTS

| 8,470,174 B2 | 6/2013 | Kiene et al. |
| 8,728,401 B2 | 5/2014 | Parent et al. |
| 9,630,148 B2 | 4/2017 | Meyer-Blumenroth et al. |
| 2003/0033935 A1 | 2/2003 | Hu |
| 2003/0222014 A1* | 12/2003 | Nakajima ............ B01D 39/163 210/490 |
| 2006/0086654 A1* | 4/2006 | Voigt ................... B01D 63/081 210/321.6 |
| 2011/0024348 A1* | 2/2011 | Meyer-Blumenroth ..................... B01D 63/081 210/435 |

FOREIGN PATENT DOCUMENTS

| CN | 1244134 A | 2/2000 |
| CN | 102006917 A | 4/2011 |

(Continued)

OTHER PUBLICATIONS

English translation of First Chinese Office Action dated Jun. 4, 2018 in corresponding Chinese application CN2015800293908.

*Primary Examiner* — Madeline Gonzalez
(74) *Attorney, Agent, or Firm* — Muncy, Geissler, Olds & Lowe, P.C.

(57) ABSTRACT

The invention relates to a filter element (1) comprising a drainage element (2) which is arranged between two filter membranes (3). According to the invention, said drainage element (2) is made of a non-woven filtering material which is arranged in a laminated manner between the filter membranes (3) respectively by means of an adhesive non-woven material (4). The invention also relates to a method for producing a filter element (1), a drainage element (2) made from a non-woven filtering material being laminated (Continued)

Figure 1:
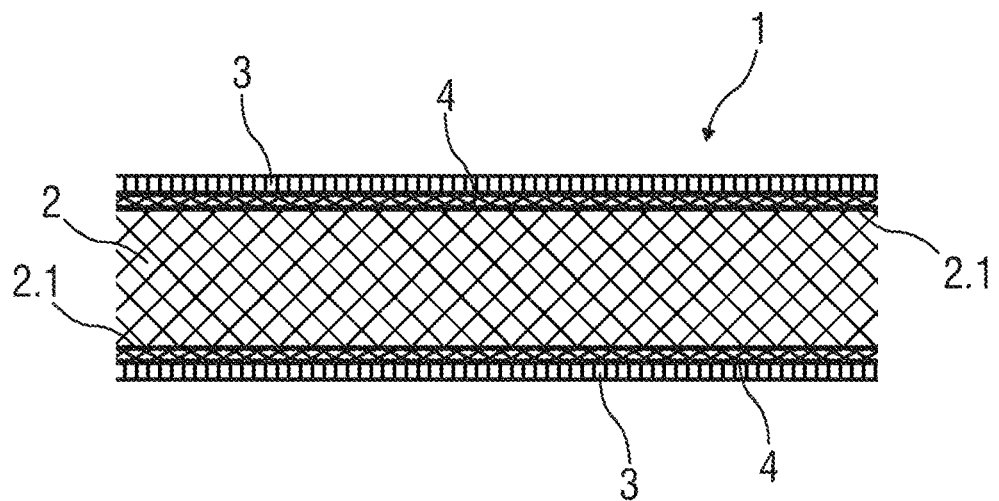

between two filter membranes (3). An adhesive non-woven material (4) is arranged between the drainage element (2) and each filter membrane (3), then lamination takes place due to the thermal effect under pressure.

20 Claims, 2 Drawing Sheets

(51) Int. Cl.
  *B01D 63/08* (2006.01)
  *B01D 69/08* (2006.01)
(52) U.S. Cl.
  CPC .... *B01D 63/081* (2013.01); *B01D 2239/0407* (2013.01); *B01D 2239/0668* (2013.01); *B01D 2239/083* (2013.01); *B01D 2239/1233* (2013.01); *B01D 2313/12* (2013.01); *B01D 2313/40* (2013.01); *B01D 2313/42* (2013.01); *B01D 2319/04* (2013.01); *B01D 2325/40* (2013.01)
(58) Field of Classification Search
  CPC ............ B01D 2313/40; B01D 2319/04; B01D 2313/42; B01D 2325/40; B01D 2239/1233; B01D 2239/083; B01D 2239/0668; B01D 2239/0407
  USPC .......................... 210/490, 505, 506, 508, 488
  See application file for complete search history.

(56) References Cited

FOREIGN PATENT DOCUMENTS

| | | |
|---|---|---|
| CN | 102196851 A | 9/2011 |
| CN | 202355939 U | 8/2012 |
| CN | 103170182 A | 6/2013 |
| DE | 36 36 207 A1 | 4/1988 |
| DE | 10 2004 051 671 A1 | 4/2006 |
| DE | 10 2008 019 085 A1 | 10/2009 |
| DE | 10 2009 043 428 A1 | 4/2011 |
| EP | 0 808 648 A1 | 11/1997 |
| WO | WO9922843 A1 | 5/1999 |
| WO | WO 2009/109308 A1 | 9/2009 |

\* cited by examiner

FILTER ELEMENT AND METHOD FOR THE PRODUCTION THEREOF

The invention relates to a filter element as classified in the preamble of claim 1 and to a method of producing said filter element.

DE 10 2008 019 085 A1 discloses a filter composite material comprising first and second filtration membranes and a woven drainage fabric arranged therebetween. The woven drainage fabric and the filtration membranes are laminated to each other using adhesive nets. A flat filter element is fabricated as a blank cut out of the filter composite material, and has a geometric shape adapted to the particular end use.

DE 10 2004 051 671 A1 discloses an apparatus for filtering matter out of liquids.

There are prior art filter elements where the drainage element used is a formed-loop spacer knit, which is a textile construct having very considerable extensibility in area.

The invention has for its object to devise an improved filter element and also an improved method of producing said filter element.

The object regarding the filter element is achieved according to the invention by the features of claim 1. The object regarding the method of producing the filter element is achieved according to the invention by a method having the features of claim 13.

Dependent claims relate to advantageous embodiments of the invention.

The filter element comprises a drainage element arranged between two filter membranes. According to the invention, the drainage element is a filtering fleece arranged between said filter membranes each laminated thereto via an adhesive fleece.

More particularly, the filtering web is constructed as a bonded fibrous nonwoven web fabric or a filter fleece, which is a stable, processable construct formed by consolidating the fibrous nonwoven web (an easily divisible fibrous construct). The adhesive web is constructed as a nonwoven fabric or an adhesive fleece.

The surprise is that the adhesive fleece used for the purposes of the invention adheres very well to the drainage element of the invention even though formed-loop spacer knit used in the prior art evinces a poor bond to adhesive fleece even when large amounts of adhesive are used.

The filter element of the invention displays high stability to tensile and compressive stresses parallel to the face normal and also very good durability. The drainage element further has a very low level of flow resistance versus the prior art articles. The filter element of the invention is further obtainable by use of adhesive fleece and hence without the large amounts of adhesive which are required in the prior art, as a result of which the flow resistance is low in the present invention. The surprise here is that notwithstanding the amount of adhesive being reduced versus the prior art an improved stability and particularly an improved long-lastingness is obtainable.

minimal lengthwise changes through plastic deformation and, on contact with water, displays versus the prior art a very low tendency to swell.

The filter element of the invention is additionally less flexible versus the prior art. This reduces any tendency to flap in the liquid flow of the crossflow regime and also engenders a very minimal change in the spacing between adjacent filter membranes in filtration service. The spacings between the filter membranes arranged according to the invention staying constant leads to an appreciably increased purifying effect. The filter element of the invention is obtainable in a particularly economical manner, since it does away with the need for a burdensome and hence costly formed-loop spacer knit which, what is more, has to be burdensomely stabilized in the prior art.

One particular advantage is that the flow resistance of the filter element according to the invention is lower versus the prior art because the area wherethrough free flow is possible is only very minimally reduced by the adhesive bonding of the invention.

The constituent parts of the filter element according to the invention each have, in the plane of their respective layers, an at least macroscopically even and isotropic distribution of material and, within each layer, such a distribution of material in the direction of the normal.

The filter element of the invention makes possible a secure form of edge closure by allowing corresponding edges of the filter membranes simply being welded together.

One embodiment of the filter element according to the invention provides that the filtering fleece is formed of first fibers and second fibers, wherein the first fibers are structural fibers and the second fibers have at least a low-melting sheath of adhesive, i.e., that the second fibers either have a low-melting sheath of adhesive or are completely low-melting. A sheath of adhesive is regarded as low melting when its melting temperature is between 70° C. and not more than 140° C., and low melting correspondingly means that the melting temperature is between 70° C. and not more than 140° C. The drainage element thus embodied has a low level of flow resistance in its area and is particularly stable in shape to tensile stresses in this area.

A further embodiment of the filter element according to the invention provides that the structural fibers consist of high-melting plastic, for example of polyester or polypropylene having a melting point above 140° C., of mineral matter or of natural fibers. Structural fibers of this type endow the filter element with a particularly high level of strength.

A further embodiment of the filter element according to the invention provides that the structural fibers have between 25 dtex and 100 dtex, more preferably 40 dtex to 60 dtex. It has conspired that high strength is attainable thereby as well as a low level of flow resistance.

A further embodiment of the filter element according to the invention provides that the second fibers have between 4 dtex and 36 dtex, more preferably 15 dtex to 20 dtex, making it possible to attain a further increase in strength as well as a low level of flow resistance.

Another embodiment of the filter element according to the invention provides that the proportion of second fibers in the filtering fleece is between 10 weight percent and 70 weight percent, making it possible to attain a particular increase in strength as well as a low level of flow resistance. It is particularly preferable for the proportion of structural fibers to be between 55 weight percent and 65 weight percent, in particular 60 weight percent, while the proportion of the second fibers in the filtering fleece is between 35 weight percent and 45 weight percent, in particular 40 weight percent.

Another embodiment of the filter element according to the invention provides that the basis weight of the drainage element is between 200 to 600 g/m$^2$, preferably between 300 to 400 g/m$^2$. A basis weight of this type cooperates with the thickness calibration to determine, in a particularly favorable manner, not only the flow resistance in the plane but also the strength of the drainage element and of the filter element.

One particular embodiment of the filter element according to the invention provides that, normal to a face, in particular to a plane of the filtering fleece, some of the fibers of the filtering fleece have an intentional perpendicular attitude due to needling or hydroentangling. This leads to a distinct improvement in the strength of the filtering fleece of the fleece fibers normal to its face with regard to compressive and tensile stresses resulting from internal or external pressure on the filtering membranes.

Another embodiment of the filter element according to the invention provides that said adhesive fleece is formed of a low-melting plastic, i.e. of a plastic with a melting temperature between 70° C. and 140° C., and that the basis weight of said adhesive fleece is between 10 g/sqm and 40 g/sqm, preferably between 15 g/sqm and 25 g/sqm. The bond between the drainage element and the filter membrane is particularly long-lasting and firm as a result.

A further embodiment of the filter element according to the invention provides that at least one surface of said drainage element has a number of channellike depressions. These channellike depressions are preferably formed by thermal embossing or via an ultrasonically based process or via a stitching process.

These channellike depressions form flow channels and are long-lastingly embossable into the filtering fleece before or after calibration. These flow channels do not impair the strength and long-lastingness of the subsequent lamination to the filter membrane, but greatly improve the water flux of the filter element.

The step of forming the channellike depressions is effected while the filtering fleece is moving, for example being transported over calendering rolls or through a sewing machine. When the filtering fleece is stationary, the step of forming the channellike depressions is effected in a static press, for example.

The width of the channellike depressions is substantially less than the thickness of the drainage element and may optionally be varied according to position.

Channel width preferably increases in the direction of suction openings of the filter membrane, in line with the filtrate quantities to be conveyed.

The channellike depressions more preferably form a square pattern the lines of which extend parallel to the diagonals of a square shaped out of the laminate. The channellike depressions form a pattern adapted to a pocket format or an end use. The channellike depressions are preferably formed through the combination of two methods of structuring, in particular along and/or across a direction of fabrication.

In one embodiment of the filter element, the drainage element, i.e., the filtering fleece, embeds and fixes at least an adsorbent and/or absorbent, a catalytically active or ion exchanger material (hereinafter called "reactive material").

In this way the filtering effect of the drainage element is enhanced to include an absorber effect and/or adsorber effect, to include catalytic or ion-exchanging reactions. In this way, the passage through the filtration layer of the medium to be purified, in particular a liquid, for example water or wastewater, may be immediately followed by the noxiants present therein being at once removed in various ways.

For example, the adsorbent and/or absorbent may comprise activated carbon, catalysts or ion-exchanging material in the form of particles, fibers or layers of these materials coated on particles or fibers.

The incorporation of reactive materials in the drainage element makes it possible to remove dissolved noxious and biologically refractory organic compounds, for example drugs causing multiresistant germs, from the medium, for example wastewater, to be purified.

The incorporation of the reactive materials in the drainage element makes it possible for not just new filtering appliances but also existing filtering appliances to be out- and retrofitted without additional apparatus requirements, space requirements and loss of filtration performance.

The reactive materials are selectable according to type and amount in order to optimize the filter element in respect of the specific problem of decontamination as well as the most economical on-stream time.

Mixtures of various reactive materials may also be provided.

The method of producing a filter element in the manner of the present invention provides that a drainage element formed of a filtering fleece is laminated between two filter membranes, wherein an adhesive fleece is arranged between said drainage element and each filter membrane and subsequently heat and pressure are applied to effect lamination.

The method of the present invention is a particularly simple way to obtain a filter element that has high stability to tensile and compressive stresses parallel to the face normal and also very good durability. In addition, the drainage element thus obtained has a very low level of flow resistance versus the prior art articles. The method of the present invention utilizes an adhesive fleece and therefore requires a very low amount of adhesive versus the prior art, as a result of which the flow resistance offered by the filter element obtained according to the invention is low. The surprise here is that notwithstanding the amount of adhesive being reduced versus the prior art an improved stability and particularly an improved long-lastingness is achievable for the filter element obtained according to the present invention.

One embodiment of the method according to the invention provides that the filtering fleece is formed of first fibers and second fibers, wherein the first fibers are structural fibers and the second fibers have at least a low-melting sheath of adhesive. This makes it possible to produce a particularly stable filter element of low flow resistance.

A further embodiment of the method according to the invention provides that the step of laminating the drainage element formed of a filtering fleece between two filter membranes is preceded by the following steps wherein:
  some of the fibers of the filtering fleece are intentionally put into a perpendicular attitude normal to the face of the filtering fleece by needling or hydroentangling, subsequently the filtering fleece is heated to a temperature above the melting temperature of the sheathing of the second fibers,
  subsequently a belt press is used to press the filtering fleece in the form of a bonded fibrous nonwoven web fabric thus produced to a thickness between 2 mm and 6 mm, preferably between 3 mm and 4 mm.

The step of needling or hydroentangling serves to improve the later strength of the filtering fleece. The step of needling is more preferably effected using a deep insertion of the needles, already essentially attaining the final thickness for the drainage element. For example, an original filtering fleece thickness of about 20 mm is reduced to the range from 4 mm to 5 mm by the needling step. The needling step preferably utilizes needles having microforks at the needle tip and/or microbarbs on the needle shank. The filtering fleece thus consolidated is subsequently subjected to further consolidation via a belt press, in particular via a calender, under application of heat before it cools down.

The laminating step preferably utilizes an adhesive fleece formed of a low-melting plastic and having a melting temperature between 70° C. and 140° C. The basis weight of the adhesive fleece is more preferably between 10 g/sqm and 40 g/sqm, more preferably between 15 g/sqm and 25 g/sqm.

Another embodiment of the method according to the invention provides that at least one surface of said drainage element has a number of channellike depressions, in particular by mechanical embossing, thermal embossing, ultrasonic embossing or stitching. This provides a simple way to produce a stable and long-lasting filter element that is particularly effective in draining away a filtrate.

In a particularly preferred embodiment, the channellike depressions are arranged in parallel groups to form a pattern.

In one embodiment of the method, at least one reactive material, is embedded and fixed in said drainage element i.e. in the filtering fleece. For example, this reactive material, consisting of one or more components, is addable to the filtering fleece in a continuous and quantitatively controlled manner during the production process of the filtering fleece. The form in which the reactive material is applied here may vary, it may be applied for example as a particle, as a fiber or as a coated layer on particles or fibers.

The filtering effect of the drainage element is thus enhanced to include a reactive effect.

Particles of activated carbon, for example, are incorporable and fixable in the drainage element by way of adsorbent and/or absorbent.

The incorporation of particles of activated carbon in the drainage element makes it possible to remove dissolved noxious and biologically refractory organic compounds from the medium, for example wastewater, to be purified.

Figure 2:
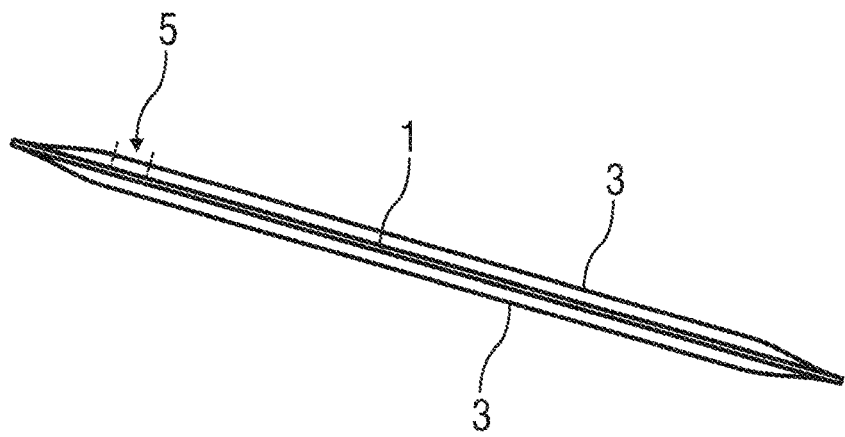
Figure 3:
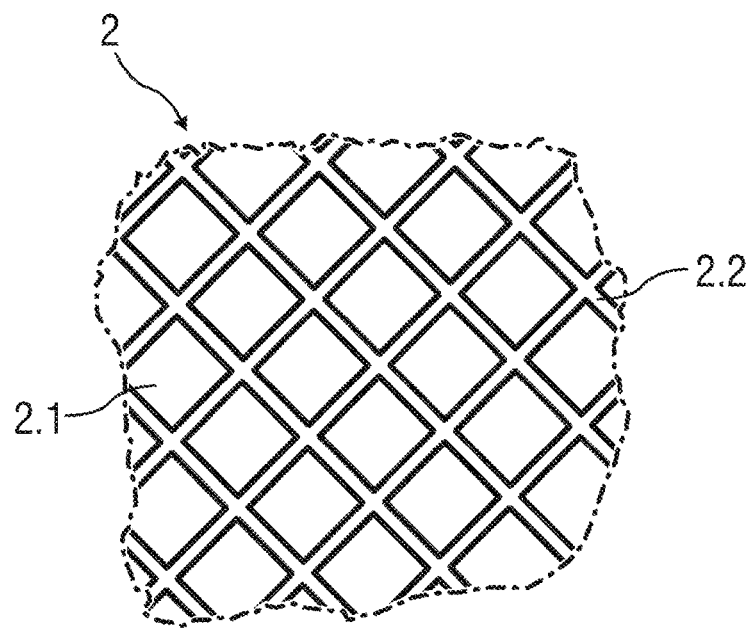
Figure 4:
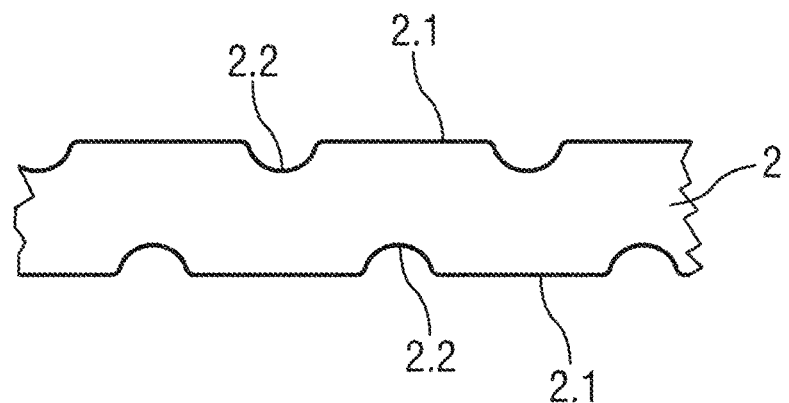

Illustrative examples of the invention will now be more particularly described with reference to drawings, wherein FIG. 1 shows a part schematic sectional depiction of a first embodiment of a filter element according to the invention, FIG. 2 shows a schematic side view of this filter element, FIG. 3 shows a part schematic plan view of an embodiment of a drainage element, and FIG. 4 shows a related part schematic sectional depiction.

Like parts are provided the same reference numerals in all figures.

FIG. 1 shows a filter element 1 according to the invention, wherein a drainage element 2 is arranged between two filter membranes 3. The drainage element 2 is laminated between the filter membranes 3 using an adhesive fleece 4 in each case.

The drainage element 2 is a filtering fleece formed of first fibers and second fibers, wherein the first fibers are structural fibers formed of high-melting plastic and the second fibers have a low-melting sheath of adhesive. It is alternatively possible to use second fibers that are completely low-melting. The proportion of second fibers in the filtering fleece is 40% and the basis weight of the drainage element is 350 g/sqm.

Some of the fibers in the filtering fleece of drainage element 2 intentionally have an attitude normal to the plane of the filtering fleece as a result of the filtering fleece having been needled.

The adhesive fleece 4 used to laminate the drainage element 2 to the filter membranes 3 is formed of a low-melting plastic and has a basis weight of 20 g/sqm.

FIG. 2 shows a side view of filter element 1 according to the invention. Said filter element 1 has a plate-type shape wherein the two filter membranes 3 completely enclose the invisible drainage element 2. The filter membrane 3 shown at right is provided a suction opening 5 wherethrough filtrate previously penetrating through filter membranes 3 into the filter element 1 is suckable out of the filter element 1, preferably by negative pressure.

FIG. 3 and FIG. 4 show a part schematic plan view of one particular embodiment of a drainage element 2 having channellike depressions 2.2 formed on its surfaces 2.1. Each surface 2.1 is provided two groups each of parallel channellike depressions 2.2 such that the two groups in both cases intersect at a right angle. The channellike depressions 2.2 serve to improve the transfer out of a filtrate.

In one embodiment, at least one reactive material is embedded and fixed in the drainage element 2, i.e., in the filtering fleece constructed as a bonded fibrous nonwoven web fabric.

The adsorbent and/or absorbent may comprise particles of activated carbon for example.

LIST OF REFERENCE NUMERALS 1 filter element
2 drainage element
2.1 surface
2.2 depression
3 filter membrane
4 adhesive fleece
5 suction opening

What is claimed is:

1. A filter element comprising:
    a drainage element comprising a filtering nonwoven fabric or a filter fleece;
    two filter membranes; and
    an adhesive nonwoven fabric or an adhesive fleece,
    wherein said drainage element is arranged between said two filter membranes each laminated thereto with the adhesive nonwoven fabric or the adhesive fleece.

2. The filter element as claimed in claim 1, wherein the filtering nonwoven fabric or the filter fleece is formed of first fibers and second fibers, and
    wherein the first fibers are structural fibers and the second fibers have at least a low-melting sheath of adhesive.

3. The filter element as claimed in claim 2, wherein the structural fibers are formed of high-melting plastic, of mineral matter or of natural fibers.

4. The filter element as claimed in claim 2, wherein the structural fibers have linear densities between 25 dtex and 100 dtex.

5. The filter element as claimed in claim 4, wherein the second fibers have linear densities between 4 dtex and 36 dtex.

6. The filter element as claimed in claim 2, wherein the proportion of the second fibers in the filtering nonwoven fabric or the filter fleece is between 10% and 70%.

7. The filter element as claimed in claim 2, wherein a basis weight of the drainage element is between 200 to 600 $g/m^2$.

8. The filter element as claimed in claim 2, wherein normal to a plane of the filtering nonwoven fabric or the filter fleece, a plurality of fibers of the filtering nonwoven fabric or the filter fleece has an intentional perpendicular attitude due to needling or hydroentangling.

9. The filter element as claimed in claim 1, wherein said adhesive nonwoven fabric or the adhesive fleece is formed of a low-melting plastic and in that a basis weight of said adhesive nonwoven fabric or the adhesive fleece is between 10 $g/m^2$ and 40 $g/m^2$.

10. The filter element as claimed in claim 1, wherein at least one surface of said drainage element has a number of channellike depressions.

11. The filter element as claimed in claim 1, at least one adsorbent and/or absorbent, and/or at least one reactive material, in particular a catalyst and/or an ion exchanger is embedded and fixed in said drainage element.

12. The filter element as claimed in claim 11, wherein the at least one reactive material is in the form of a particle, in the form of a fiber or in the form of a coated layer on particles or fibers.

13. A method of producing a filter element comprising:
    laminating a drainage element formed of a filtering nonwoven fabric or filter fleece between two filter membranes; and
    arranging an adhesive nonwoven fabric or an adhesive fleece between said drainage element and each of the two filter membranes,
    wherein heat and pressure are subsequently applied to effect lamination.

14. The method as claimed in claim 13, wherein the filtering nonwoven fabric or the filter fleece is formed of first fibers and second fibers, and
    wherein the first fibers are structural fibers and the second fibers have at least a low-melting sheath of adhesive.

15. The method as claimed in claim 13, wherein
    a plurality of fibers of the filtering nonwoven fabric or the filter fleece is intentionally put into a perpendicular attitude normal to a face of the filtering nonwoven fabric or the filter fleece by needling or hydroentangling,
    subsequently the filtering nonwoven fabric or the filter fleece is heated to a temperature above the melting temperature of a sheathing of the second fibers, and
    subsequently a belt press is used to press the filtering nonwoven fabric or the filter fleece on a thickness between 2 mm and 6 mm before lamination is effected.

16. The method as claimed in claim 13, wherein at least one surface of said drainage element has a number of channellike depressions, in particular by mechanical embossing, thermal embossing, ultrasonic embossing or stitching.

17. The method as claimed in claim 16, wherein the channellike depressions are arranged in parallel groups to form a pattern.

18. The method as claimed in claim 13, wherein at least one adsorbent and/or absorbent, and/or at least one reactive material, in particular a catalyst and/or an ion exchanger is embedded and fixed in said drainage element.

19. The method as claimed in claim 18, wherein the at least one reactive material is embedded and fixed into said drainage element in the form of particles, fibers or as a coating layer on particles or fibers.

20. The filter element as claimed in claim 2, wherein a basis weight of the drainage element is between 300 to 400 $g/m^2$.

* * * * *